US009195601B2

(12) United States Patent
Accapadi et al.

(10) Patent No.: US 9,195,601 B2
(45) Date of Patent: *Nov. 24, 2015

(54) SELECTIVE RELEASE-BEHIND OF PAGES BASED ON REPAGING HISTORY IN AN INFORMATION HANDLING SYSTEM

(71) Applicant: INTERNATIONAL BUSINESS MACHINES CORPORATION, Armonk, NY (US)

(72) Inventors: Mathew Accapadi, Austin, TX (US); Grover C Davidson, II, Round Rock, TX (US); Dirk Michel, Austin, TX (US); Bret R Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,692

(22) Filed: Nov. 26, 2012

(65) Prior Publication Data

US 2014/0149672 A1 May 29, 2014

(51) Int. Cl.
*G06F 12/08* (2006.01)

(52) U.S. Cl.
CPC ........ *G06F 12/0817* (2013.01); *G06F 12/0891* (2013.01)

(58) Field of Classification Search
CPC ...... G06F 12/122; G06F 12/12; G06F 12/121
USPC ......................................................... 711/133
See application file for complete search history.

(56) References Cited

U.S. PATENT DOCUMENTS 7,543,124 B1 6/2009 Accapadi
2004/0068627 A1 4/2004 Sechrest
(Continued)

FOREIGN PATENT DOCUMENTS

WO 2010/020992 A1 2/2010

OTHER PUBLICATIONS

Aix—"NFS Monitoring and Tuning", AIX & System P Community, downloaded from http://www.torontoaix.com/aix-commands/aix-network-performance/nfs-monitoring-and-tuning on Oct. 29, 2012 (pp. 1-7).

(Continued)

*Primary Examiner* — Aimee Li
*Assistant Examiner* — Edmund Kwong
(74) *Attorney, Agent, or Firm* — Parashos Kalaitzis; Mark P Kahler (57) ABSTRACT

An information handling system (IHS) includes an operating system with a release-behind component that determines which file pages to release from a file cache in system memory. The release-behind component employs a history buffer to determine which file pages to release from the file cache to create room for a current page access. The history buffer stores entries that identify respective pages for which a page fault occurred. For each identified page, the history buffer stores respective repage information that indicates if a repage fault occurred for such page. The release-behind component identifies a candidate previous page for release from the file cache. The release-behind component checks the history buffer to determine if a repage fault occurred for that entry. If so, then the release-behind component does not discard the candidate previous page from the cache. Otherwise, the release-behind component discards the candidate previous page if a repage fault occurred.

13 Claims, 6 Drawing Sheets

(56) References Cited

U.S. PATENT DOCUMENTS

| | | | |
|---|---|---|---|
| 2004/0083341 A1* | 4/2004 | Robinson et al. | 711/133 |
| 2005/0138289 A1* | 6/2005 | Royer et al. | 711/118 |
| 2006/0069876 A1 | 3/2006 | Bansal | |
| 2008/0025244 A1 | 1/2008 | Hassan | |
| 2008/0120469 A1* | 5/2008 | Kornegay et al. | 711/133 |
| 2008/0209131 A1* | 8/2008 | Kornegay et al. | 711/135 |
| 2012/0005401 A1 | 1/2012 | Anand | |

OTHER PUBLICATIONS

Braden—"Disk IO Tuning in AIX 6.1 and 5.3", IBM Systems Group, IBM Corp. (2009) (pp. 1-51).

Day—"LRU Cache Implementation in C++", downloaded from http://timday.bitbucketorg/lru_html (Copyright 2010-2012) pp. 1-21.

IBM1—"The Release-Behind Mechanism", downloaded from http://publib.boulder.ibm.com/infocenter/pseries/v5r3/topic/com.ibm.aix.prflungd/doc/prftungd/release_behind_mech.htm on Oct. 29, 2012 (p. 1).

IBM2—"Effects of NFS Data Caching on Read Throughput", downloaded from http://publib.boulder.ibm_com/infocenter/pseries/v5r3/topic/com.ibm.aix.prftungd/doc/pritungd/eff_nfs_data_cach_read_through.htm on Oct. 29, 2012 (p. 1).

IBM3—"Cache File System", downloaded from http://publib.boulder.ibm.com/infocenter/pseries/v5r3/topic/com.ibm.aix.prftungd/doc/prftungd/cache_fs.htm on Oct. 29, 2012 (pp. 1-2).

Jew—"AIX 5L/6 Performance Tuning Part III: Real-world Case-studies illustrating the Recognition and Remedy of Performance Issues", IBM Power Technical University 2010: Las Vegas (2010) pp. 1-25.

Kernel—"Unevictable LRU Infrastructure", downloaded from http://www.kernel.org/doc/Documentation/vm/ unevictable-lru.txt on Oct. 30, 2012 (pp. 1-13).

Oracle—"Read-Through, Write-Through, Refresh-Ahead and Write-Behind Caching", Oracle Coherence Knowledge Base, 2006 (pp. 1-7).

* cited by examiner

FIG. 3B ent in system memory.
SELECTIVE RELEASE-BEHIND OF PAGES BASED ON REPAGING HISTORY IN AN INFORMATION HANDLING SYSTEM

BACKGROUND

The disclosures herein relate generally to file systems for information handling systems (IHSs), and more specifically, to methodology for efficiently removing information from files in the memory of an IHS.

BRIEF SUMMARY

In another embodiment, an information handling system (IHS) is disclosed that includes a processor and a system memory with a file cache. The system memory is coupled to the processor and includes an operating system with a release-behind component that is configured to store a plurality of pages in the file cache, the plurality of pages including previous pages. The release-behind component is also configured to receive a request for a current page. The release-behind component is further configured to select a candidate previous page for discarding from the file cache. The release-behind component is still further configured to test to determine if the candidate previous page is identified by an entry in a history buffer in the system memory. The release-behind component is also configured to discard the candidate previous page from the file cache if the test determines that the candidate previous page is not identified by an entry in the history buffer, and if the candidate previous page is identified by an entry in the history buffer, then the release-behind component determines if repage information in the history buffer corresponding to the candidate previous page indicates a repage fault for the candidate previous page, such that the candidate previous page remains in the file cache if the repage information indicates a repage fault and the candidate previous page is discarded from the file cache if the repage information does not indicate a repage fault.

In yet another embodiment, a release-behind computer program product is disclosed that includes a non-transitory computer readable storage medium. The release-behind computer program product includes first instructions that store a plurality of pages in a file cache of a system memory, the plurality of pages including previous pages. The release-behind computer program product also includes second instructions that receive a request for a current page and third instructions that select a candidate previous page for discarding from the file cache. The release-behind computer program product further includes fourth instructions that test to determine if the candidate previous page is identified by an entry in a history buffer in the system memory. The release-behind computer program product still further includes fifth instruction that discard the candidate previous page from the file cache if the test determines that the candidate previous page is not identified by an entry in the history buffer, and if the candidate previous page is identified by an entry in the history buffer, then the fifth instructions determine if repage information in the history buffer corresponding to the candidate previous page indicates a repage fault for the candidate previous page, such that the candidate previous page remains in the file cache if the repage information indicates a repage fault and the candidate previous page is discarded from the file cache if the repage information does not indicate a repage fault. The first, second, third, fourth and fifth instructions are stored on the non-transitory computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

The disclosed information handling system (IHS) includes a nonvolatile storage that stores file pages. The IHS employs a system memory that includes a file cache and a history buffer. The file cache stores file pages that an operating system (OS) retrieves from nonvolatile storage. The history buffer stores page identification information and repage information. The page identification information identifies pages that the OS previously read and stored in the file cache. The history buffer may include respective repage information for each entry of page identification information in the history buffer. The repage information indicates if an identified page was previously read and a repage fault occurred.

The OS includes identifies a candidate page for discarding from the file cache. Before discarding a candidate page from the file cache, a release-behind component checks the history buffer to see if a repage fault occurred for the candidate page. If the repage information in the history buffer for the candidate page indicates that a repage fault occurred for the candidate page, then the release-behind component protects the candidate page by not discarding the candidate page from the file cache. However, if the repage information in the history buffer indicates that a repage fault did not occur for the candidate page, then the release-behind component discards the candidate page from the cache. In this manner, the file cache continues to store pages that are likely to be frequently read in the future.

Figure 1A:
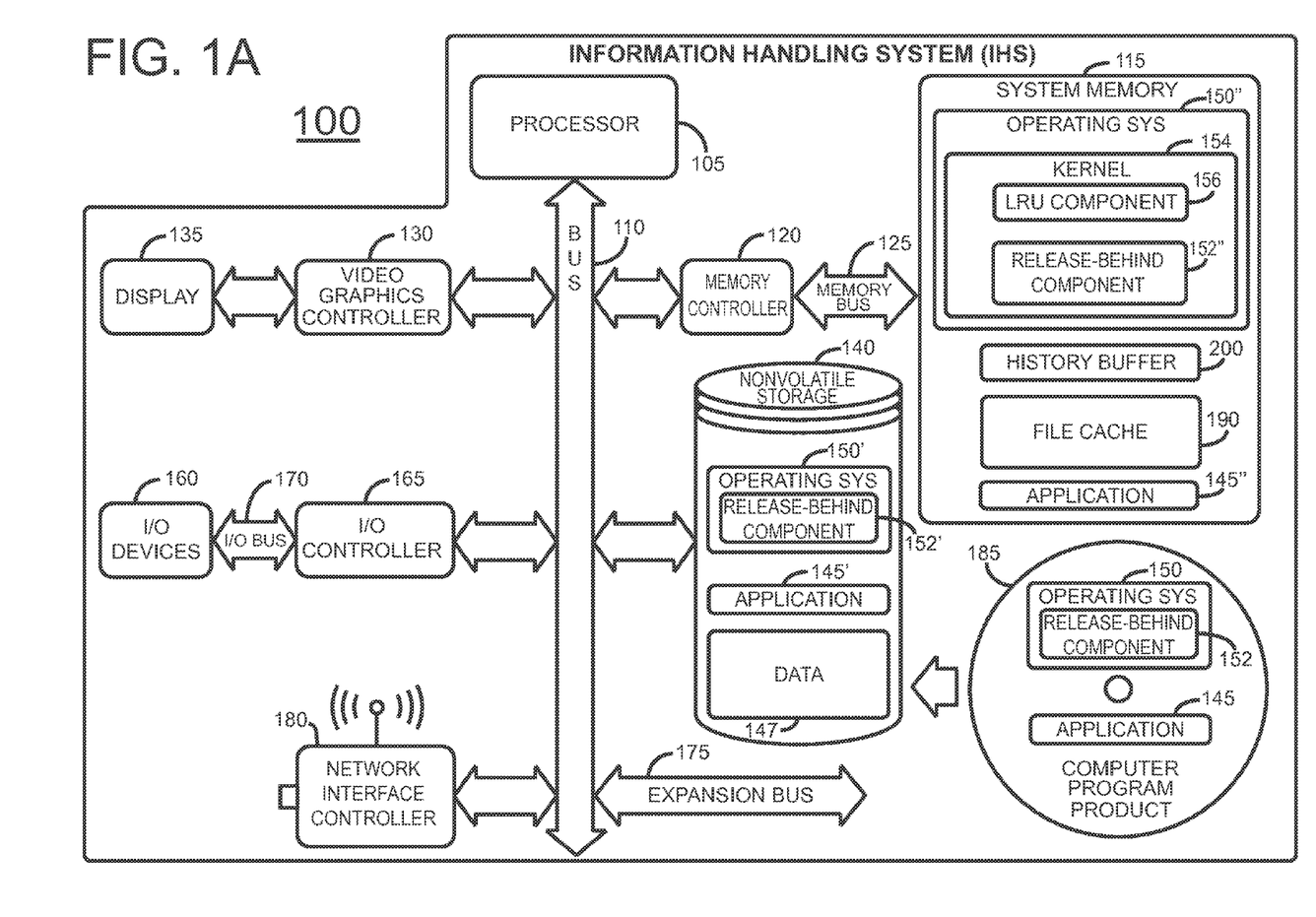
FIG. 1A is a block diagram of one embodiment of the disclosed information handling system (IHS).

FIG. 1A is a block diagram of an IHS 100 that practices the disclosed file page handling methodology. IHS 100 includes a processor 105 that may include multiple cores. User IHS 100 processes, transfers, communicates, modifies, stores or otherwise handles information in digital form, analog form or other form. IHS 100 includes a bus 110 that couples processor 105 to memory 115 via a memory controller 120 and memory bus 125. System memory 115 may also be referred to as main memory. System memory 115 may be a static random access memory (SRAM) array or a dynamic random access memory (DRAM) array. Processor 105 may also include local memory such as L1, L1 and L3 caches. A video graphics controller 130 couples display 135 to bus 110. Nonvolatile storage 140, such as a hard disk drive, solid state drive (SSD), CD drive, DVD drive, or other nonvolatile storage couples to bus 110 to provide IHS 100 with permanent storage of information. System memory 115 and nonvolatile storage 140 are both forms of memory stores. Nonvolatile storage 140 stores an operating system 150' (OPERATING SYS) that governs operation of IHS 100. Nonvolatile storage 140 also stores one or more applications 145' that processor 110 executes. Nonvolatile storage 140 also stores data 147 that operating system 150' and application 145' may employ. I/O devices 160, such as a keyboard and a pointing device, couple to bus 110 via I/O controller 165 and I/O bus 170.

One or more expansion busses 175, such as USB, IEEE 1394 bus, ATA, SATA, PCI, PCIE, DVI, HDMI and other busses, couple to bus 110 to facilitate the connection of peripherals and devices to IHS 100. A network interface controller 180 couples to bus 110 to enable IHS 100 to connect by wire or wirelessly to a network and/or other information handling systems. Network interface controller 180 may also be called a network communication adapter or a network adapter. While FIG. 1 shows one IHS that employs processor 105, the IHS may take many forms. For example, IHS 100 may take the form of a desktop, server, portable, laptop, notebook, tablet, or other form factor computer or data processing system. IHS 100 may take other form factors such as a gaming device, a personal digital assistant (PDA), a portable telephone device, a communication device or other devices that include a processor and memory.

IHS 100 includes a release-behind component computer program product 152 on digital media 185 such as a CD, DVD, flash drive or other media. In one embodiment, release-behind component 152 is within user IHS 100 as shown in FIG. 1. Release-behind component 152 may be a part of OS 150 of digital media 185. Digital media 185 may also store application 145. In actual practice, a user or other entity may load OS 150, release behind component 152 and application 145 in nonvolatile storage 140 as OS 150', release behind component 152' and application 145'. When IHS 100 initializes, the IHS loads OS 150' with release-behind component 152' into system memory 115 for execution as operating system 150" and release behind component 152". IHS 100 also loads application 145' into system memory 115 for execution as application 145".

Figure 1B:
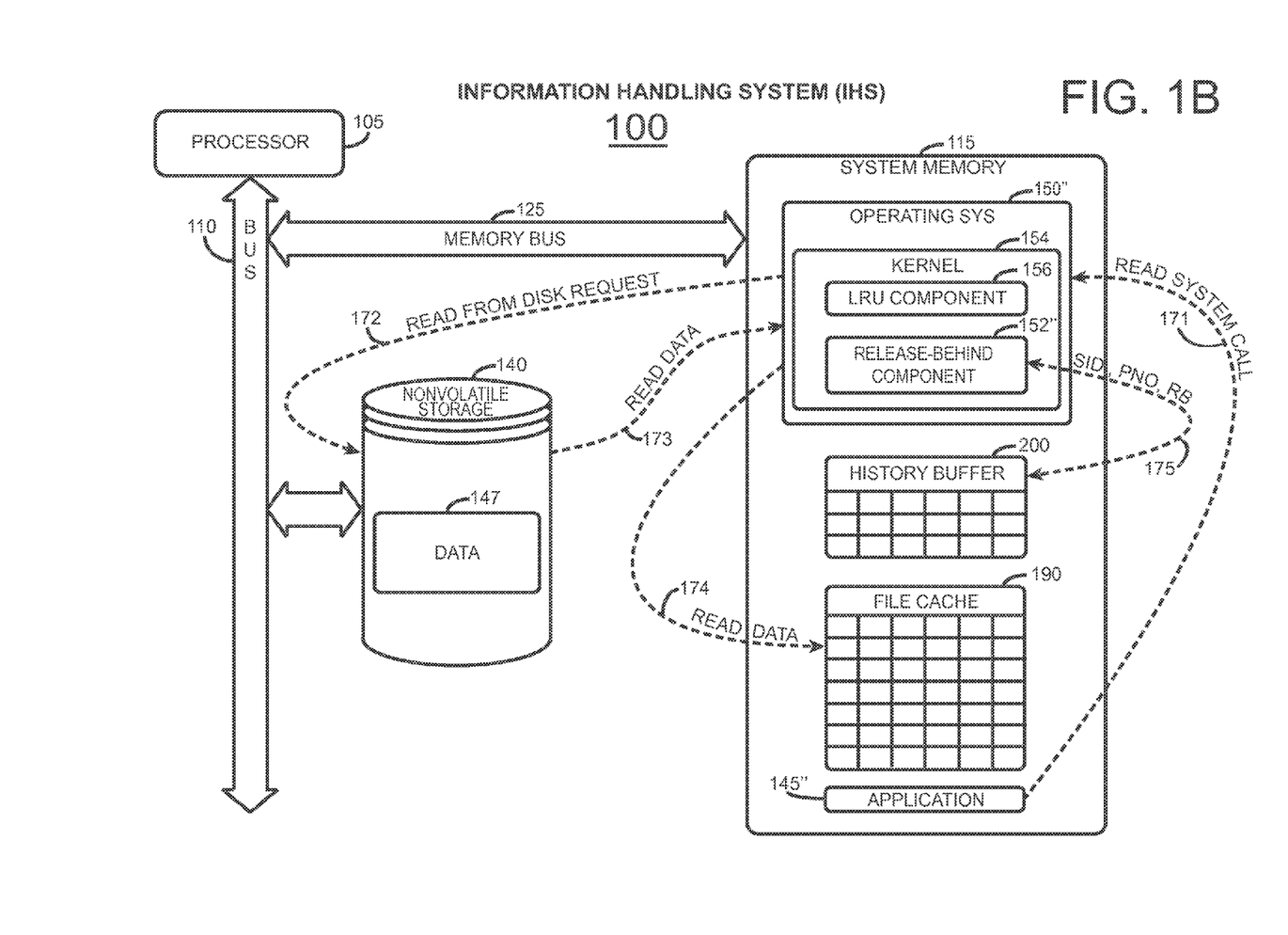
FIG. 1B is a more detailed block diagram of the disclosed information handling system (IHS) showing a release-behind component in system memory.

FIG. 1B is a more detailed block diagram of IHS 100 that focuses on the structures of nonvolatile storage 140 and system memory 115. System memory 115 stores operating system 150" as shown in FIG. 1B. Operating system 150" includes a kernel 154. Kernel 154 includes a least frequently used (LRU) component 156 and a release-behind component 152". System memory 115 also stores a file cache 190, a history buffer 200 and a representative application 145". File cache 190, history buffer 200, release-behind component 152" and nonvolatile storage 140 together form a file system that IHS 100 employs.

Application 145" reads pages of data 147 that nonvolatile storage 140 stores. In one embodiment, this reading takes the form of reading pages from a disk drive. In more detail, application 145" requests a particular page from nonvolatile storage 140 by sending a read system call 171 to operating system 150". In response to read system call 171, operating system 150" sends a read from disk request 172 to nonvolatile storage 140. In response to read from disk request 172, nonvolatile storage 140 transmits the requested page as read data 173 back to operating system 150". Operating system 150" transmits the read data as read data 174 to file cache 190 for storage therein. Once the read data is in file cache 190, application 145" may see and access that data which is the requested file page. In this particular embodiment, the size of a file page is 4 KB, although larger or smaller file pages may be used as well depending on the particular implementation.

As application 145" and other applications execute, file cache 190 may accumulate a very large number of file pages therein. Least frequently used (LRU) component 156 runs in the background to discard those file pages in file cache 190 that are least frequently used. Release behind-component 152" provides another mechanism for controlling those pages that operating system 150 discards from file cache 190. Release-behind component 152" runs in the background to discard file pages from file cache 190 after storage in file cache 190 unless those file pages are often accessed. Release-behind component 152" effectively recognizes when operating system 150" repetitively accesses important file pages from nonvolatile storage 140. Under predetermined conditions discussed below, release-behind component 152" keeps those repetitively accessed important file pages in file cache 190 instead of discarding them. In this manner, important file pages are more readily accessible in file cache 190 by application 145" than might otherwise be possible. In other words, one embodiment of the disclosed methodology recognizes which file pages are being reread over and over again. The disclosed methodology prioritizes those pages and keeps those often read pages in file cache 190 while removing other pages, as discussed in more detail below.

When operating system 150" reads a particular file page from nonvolatile storage 140, file cache 190 stores the particular file page. Release behind component 152" stores a page identification information entry in file history buffer 200 to indicate that the particular file page is stored in file cache 190. Each time that OS 150" accesses another page from nonvolatile memory 140, file cache 190 stores that file page and OS 150" makes a respective entry in history buffer 200 to indicate that OS 150" accessed that file page.

The first time that OS 150" accesses a particular page from nonvolatile storage 140, there is a page fault because file cache 190 does not currently store the requested file page. As discussed above, release-behind component 152" stores a page identification information entry in history buffer 200 to indicate that OS 150" accessed this particular page. Under conditions discussed below, the release-behind component 152" may discard the particular page from file cache 190 after passing the content of the particular page to application buffers of the application that requested the content, such as application 145". The next time that OS 150" accesses the particular page from nonvolatile storage 140, there is a "repage fault". In other words, OS 150" encounters another page fault for the same file page. OS 150" again retrieves the requested file page from nonvolatile storage 140 and stores the requested file page in file cache 190.

In history buffer 200, a respective repage bit associates with each page identification information entry. In response to a repage fault for the particular page, release-behind component 152" sets the repage bit for that entry to indicate that a repage fault occurred for that entry. The next time that OS 154 accesses this particular page, the release-behind component 152" observes that the repage bit for this particular page is set in the history buffer 200, and in response to this determination, release-behind component 152" instructs file cache 190 to not discard the particular page. In this manner, release-behind component 152" determines that this particular page is an important page, i.e. a page frequently accessed, that file cache 190 should not currently discard. The repage bit discussed above is repage information. The repage information indicates a particular page in history buffer 200 that exhibits page faults.

Figure 2A:
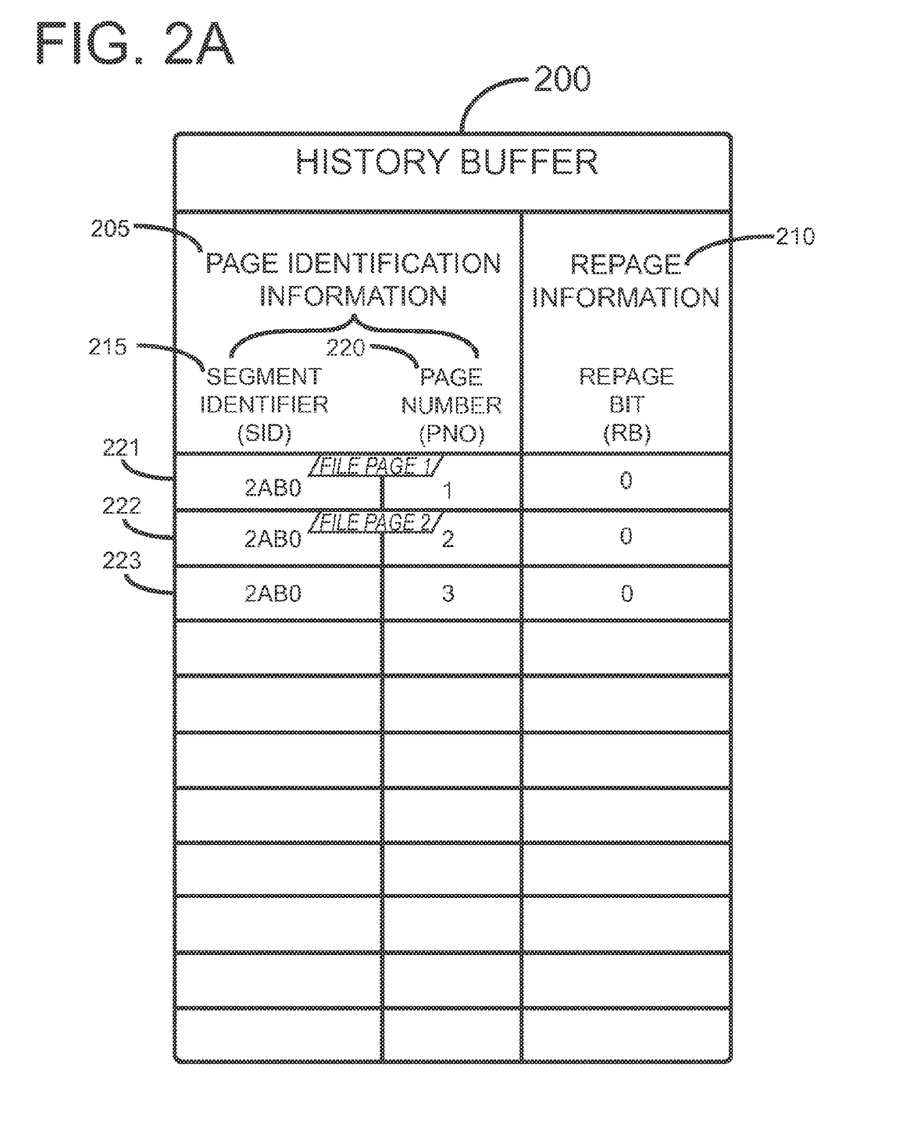
FIG. 2A is a block diagram of a history buffer that is representative of the history buffer of FIG. 1B.

FIG. 2A is a representation of history buffer 200. History buffer 200 includes page identification information entries 205 and respective repage information 210 arranged in columns and rows as shown. Each page identification information entry 205 indicates that file cache 190 stores a particular file page corresponding to that entry. In other words, page identification information entry 205 identifies a particular file page as being in file cache 190. In this particular embodiment, each page identification information entry includes a segment identifier (SID) 215 and a page number (PNO) 220 that together form the page identification information entry 205. Each file page that OS 150" retrieves from nonvolatile storage 140 includes an SID 215 as part of that file page's address. That SID 215 together with PNO 220 form a page identification information entry 205. Each SID and PNO together specify a different file page. Dashed line 175 in FIG. 1B indicates that release behind component 152" may send SID 215, PNO 220 and a repage bit RB to history buffer 152 for storage therein, and that release behind component 152" may access SID 215, PNO 222 and a repage bit RB for each entry in history buffer 200.

In a representative example, row 221 of history buffer 200 includes an SID value of 2AB0 and a PNO value 1 that together form a page identification information entry for a corresponding respective file page in file cache 190. The repage information for that entry in row 221 exhibits a repage bit (RB) equal zero. The RB=0 value indicates that the file page identified by page identification information of this entry did not exhibit a repage fault. Likewise, row 222 of history buffer 200 includes an SID value of 2AB0 and a PNO value 2 that together form a page identification information entry for another corresponding respective file page in file cache 190. The repage information for that entry exhibits a repage bit (RB)=0 because a repage fault for the did not yet occur for this entry.

At a high level, history buffer 200 tracks repage faults. When OS 150" accesses a page such as a file page 1 in nonvolatile storage 140, OS 150" identifies that page in history buffer 200. To identify file page 1 in the history buffer 300, the release-behind component 152" stores an entry for file page 1 in row 221 as seen in FIG. 2A. More particularly, release behind component 152" stores an SID of 2AB0 and a page number of 1 as page identification information in row 221, as shown. Thus, a page identification information entry now appears in row 1 for file page 1. In other words, when OS 150" accesses file page 1 from nonvolatile storage 140, release behind component 152" identifies file page 1 in history buffer 200 with a corresponding entry. If this is the first time that OS 150" accessed file page 1, then release behind component 152" does not set the corresponding repage information, i.e. the repage bit (RB), in history buffer 200. In other words, the repage bit (RB) remains equal to zero (0), as shown in row 221. In the example of FIG. 2A, OS 150" also accesses file page 2 in nonvolatile storage 140 for the first time. Release-behind component 152" stores a page identification information entry corresponding to file page 2 in row 222 of history buffer 200. The repage bit (RB) is likewise zero (0) for the file page 2 entry because this is the first time that OS 152" accessed file page 2.

To reiterate, when OS 150" accesses file page 1 for the first time, release-behind component 152" identifies file page 1 in history buffer 200 as shown the entry in row 221. The corresponding repage bit (RB) is set to 0 because this is the first time that OS 150" accesses file page 1 and stores file page 1 in file cache 190. Release-behind component 152" discards file page 1 from history buffer 200 after application 145" accesses file page 1, but does not discard the page identification entry of file page 1 in history buffer 200.

Figure 2B:
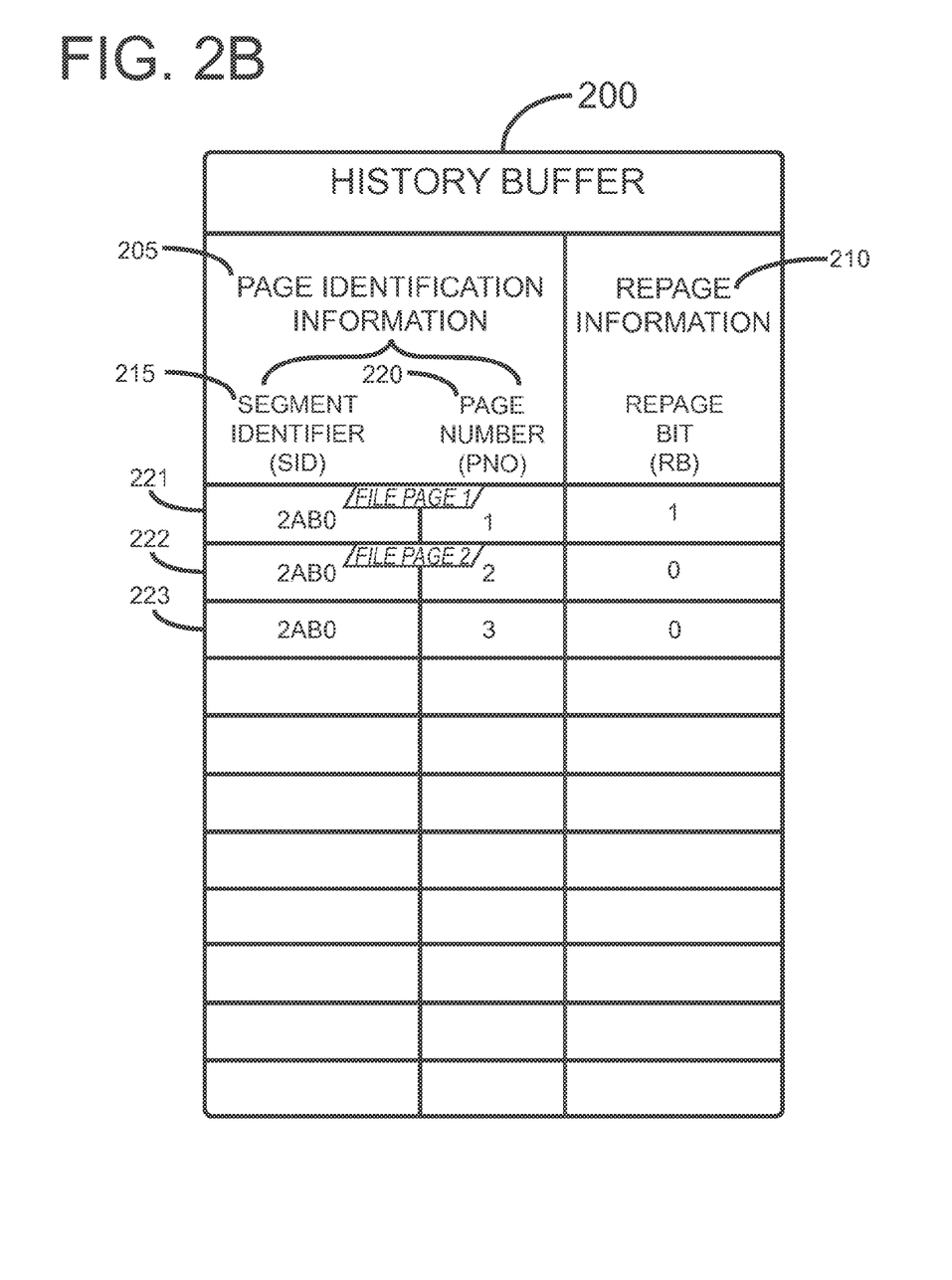
FIG. 2B is a block diagram of a history buffer that is representative of the history buffer of FIG. 1B.

After accessing file page 1, OS 150" accesses file page 2 in nonvolatile storage 140. In response, release-behind component 152" stores an identification of file page 2 in row 222, as shown in FIG. 2A. Being the first time that OS 150" accessed file page 2, the repage bit corresponding to this entry is set to zero (RB=0) as shown. Assume now that after accessing the file page 2, OS 150" attempts to access file page 1 again. File page 1 is no longer in file cache 190 and thus a repage fault occurs. For this reason, OS 150" must go back and again retrieve file page 1 from nonvolatile storage 140. Release behind component 152" checks history buffer 200 to determine if history buffer 200 includes an entry corresponding to file page 1. In this example, release behind component 152" determines that history buffer 200 does indeed include an identification of file page 1 therein. In response, release behind component 152" sets the repage bit for this entry to RB=1, as shown in FIG. 2B. This indicates that there has been 2 page faults for file page 1, the second page fault being a repage fault.

Assume now that OS 150" wants to access yet another page. Subsequent to accessing that page, release behind component 152" may consider file page 1 for discard from file cache 190. Release behind component 152" checks history buffer 200 for the entry corresponding to file page 1 and sees that the repage bit for file page 1 is set to 1 (RB=1). In response to determining that the repage bit for file page 1 is set to 1, release behind component 152" prevents file page 1 from currently being discarded, i.e. released, from the file cache 190. In this manner, release behind component 152" keeps information that OS 150" reads over and over again in file cache 190.

Figure 3A:
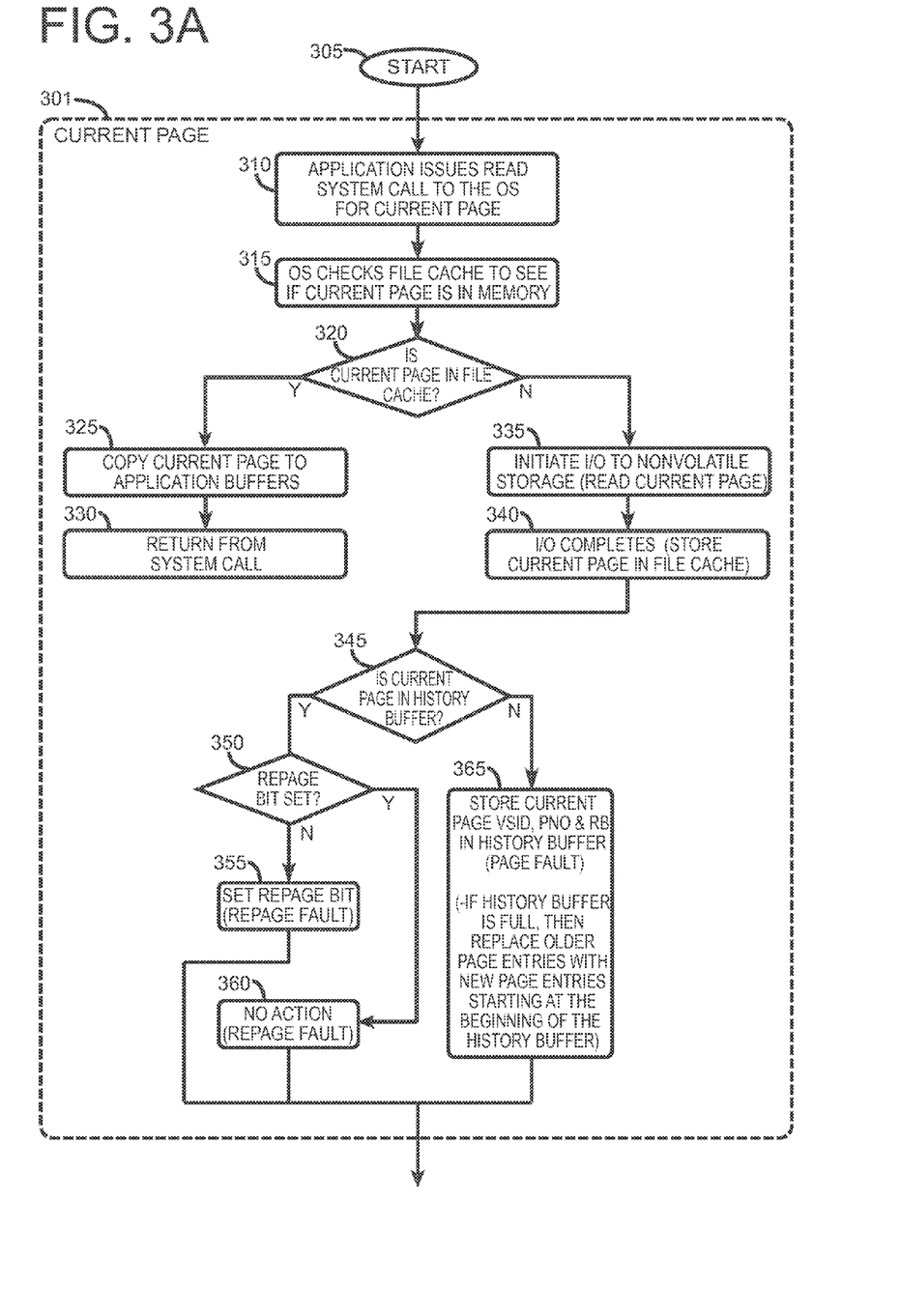
FIG. 3A is a flowchart that shows one way in which the disclosed release-behind methodology may operate on a current page in one embodiment of the IHS.
Figure 3B:
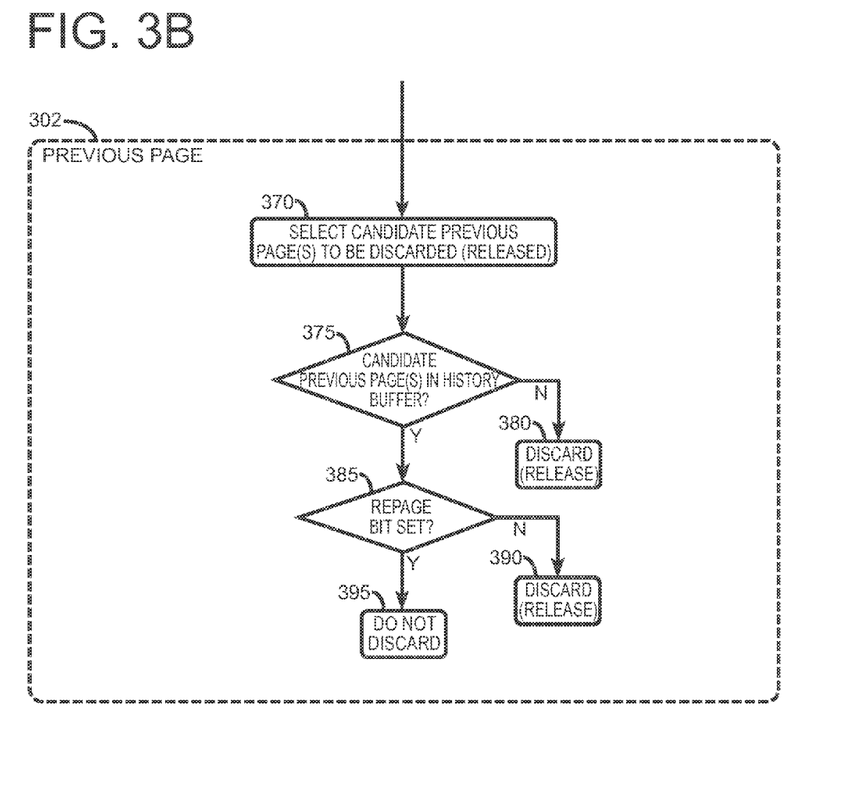
FIG. 3B is continuation of the flowchart of FIG. 3A that shows one way in which the disclosed release-behind methodology may operate on a previous page in one embodiment of the IHS.

FIGS. 3A and 3B show a flowchart that depicts process flow in one embodiment of the disclosed release-behind methodology. FIG. 3A shows process flow for handling a request to access to a current page, while FIG. 3B shows process flow for a release-behind mechanism that controls the discarding of previous page(s) from file cache 190. Process flow commences at start block 305. Application 145" issues a read system call to operating system 150" for a current page, as per block 310. In other words, application 145" desires to read a file page in nonvolatile storage 140, that page being designated the currently accessed page, i.e. the current page. Before accessing nonvolatile storage 144 to retrieve the current page, OS 150" first checks file cache 190 in system memory 115 to determine if file cache 190 already stores the current page, as per block 315.

In more detail, operating system 150" performs a test to determine if the current page is in the file cache 190, as per decision block 320. If the current page is already in file cache 190, then OS 150" copies the current page from file cache 190 to the application buffers (not shown) in application 145", as per block 325. OS 150" returns from the read system call, as per block 330. For example, process flow may continue back to the application issues read system call block 310.

Returning to decision block 320, if OS 150" determines that the current page is not in file cache 190, then OS 150" initiates an I/O operation to nonvolatile storage 140 to retrieve the current page, as per block 335. The I/O operation completes and OS 152" stores the current page in file cache 190, as per block 340. The current page is defined as the file page that OS 150" currently accesses from nonvolatile storage 140 or file cache 190. A previous page is defined as a page that OS 150" previously accessed from nonvolatile storage 140 or file cache 190 prior to accessing the current page. As time goes by, a current page become a previous page when OS 150" moves on to process a next page.

After storing the current page in file cache 190, release-behind component 152" performs certain actions on the current page and certain actions on a previous page or pages.

Dashed lined box 301 of FIG. 3A indicates the actions that release behind component 152" performs on the current page and dashed lined box 302 of FIG. 3B indicates the actions that release-behind component 152" performs on a previous page.

More particularly, after storing the current page in file cache 190 as per block 340, release-behind component 152' performs a test to determine if the current pages is identified by an entry in history buffer 200, as per decision block 345. If the current pages is identified by an entry in history buffer 200, then release-behind component 152" performs a test to determine if the repage bit corresponding to the current page entry in history buffer 200 is set or not set, as per decision block 350. If the repage bit for the current page entry is not set, then release-behind component 152" sets the repage bit corresponding to the current page entry in history buffer 200, as per block 355. Setting the repage bit in this manner indicates that a repage fault occurred for the current page. However, if the repage bit is already set for the current page entry in history buffer 200, then release-behind component 152" takes no action, as per block 360. Taking no action in this manner and leaving the repage bit set for the current entry indicates that another repage fault occurred for the current page.

However, if release-behind component 152" determines at decision block 345 that the current page is not identified by an entry in history buffer 200, then release-behind component 152" stores an entry in history buffer 200 that corresponds to the current page. More particularly, release-behind component 152" writes the segment identifier (SID) and page number (PNO) of the current page as a page identification information entry in history buffer 200, as per block 365. Release-behind component 152" sets the corresponding repage bit for this current page entry to RB=0, thus leaving the RB bit unset, to indicate a repage fault did not yet occur. If history buffer 365 is full when release-behind component 152" attempts to store an entry corresponding to the current page, then release-behind component 152" may replace older entries in history buffer 200 with new page entries starting at the beginning of history buffer 200.

In one embodiment, after operating system 150" performs the operations on the current page that dashed line box 301 indicates in FIG. 3A, release-behind component 150" perform the operations on a previous page that dashed line box 302 of FIG. 3B indicates. Release-behind component 152" selects a candidate previous page to be considered for discarding, as per block 370. More particularly, to select candidate pages for potential discarding, i.e. release-behind, release-behind component 152" checks to see if the current page read has crossed a cluster boundary. A cluster is a contiguous group of pages where the number of pages in this group of pages, i.e. cluster, is a tunable option. A cluster boundary is a boundary between one cluster and another cluster. If a page read has crossed a cluster boundary such that the page being read is in the next contiguous cluster, then the pages of the cluster previous to the cluster where the page is being read will be discarded from the file cache.

Before discarding the candidate previous pages, release-behind component 152" performs a test to determine if the candidate previous pages includes an entry in history buffer 200, as per decision block 375. If history buffer 200 does not contain an entry for the candidate previous pages, then release behind component 152" does not protect the candidate previous pages from release, but instead discards that candidate previous pages, as per block 380. However, if release-behind component 152" determines that the candidate previous pages do include entries in history buffer 200, then release-behind component 152" performs a test to determine if the entries in the history buffer 200 for the candidate previous pages are associated with a repage bit that is set, as per decision block 385. If the repage bit corresponding to the entries for the candidate previous pages in the history buffer 200 is not set, then release-behind component 152" does not protect the candidate previous pages from release, but instead discards the candidate previous pages from file cache 190, as per block 390. However, if the repage bit in history buffer 200 is set for the candidate previous pages, then release behind component 152" protects the candidate previous pages in file instruction cache 190 and does not discard the candidate previous pages, as per block 395.

Those skilled in the art will appreciate that it is possible to invert the logic described above for the repage bit (RB) and the disclosed methodology will still operate successfully. In other words, in the embodiment described above, a repage bit equal to zero (0), i.e. (RB=0), indicates that a repage fault did not yet occur for a particular entry in the history buffer, while RB=1 indicates that a repage fault did occur for the particular entry in the history buffer. It is completely equivalent to the logic described above to employ a repage bit equal to one (1), i.e. (RB=1), to indicate that a repage fault did not occur for a particular entry in the history buffer, while RB=0 indicates that a repage fault did occur for the particular entry in the history buffer.

To summarize one embodiment of the disclosed methodology, a release behind component determines which file pages to release, i.e. discard, from the file cache. To assist in making this determination, the release-behind component employs a history buffer to track repage faults. When an application requests a file page from the OS, the OS first check to see if the requested file page is already in the file cache in system memory. If the requested file page is in the file cache, then the OS sends the requested page from the file cache to the application. However, if the requested file page is not in the file cache, a page fault occurs. When a page fault occurs, the OS retrieves the file page from nonvolatile storage and sends the file page to the application. To achieve this, the OS may store the requested file page in the file cache from which the application may retrieve the requested file page.

When a page fault occurs the first time for a particular file page, the release-behind component stores an entry in the history buffer to indicate that the OS accessed the requested file page and that a page fault occurred. After the application receives the requested file page and the history buffer stores an entry identifying the requested file page, the release-behind component discards the requested file page from the cache. At this point in time the repage bit for this entry is not yet set because, while a page fault has occurred, a repage fault for the same requested page has not yet occurred. A repage fault occurs when the OS attempts to again access the same file page and that file page is again not in the file cache.

When a repage fault occurs for a file page for which the history buffer already includes an entry, the release-behind component sets the repage bit corresponding to that entry. The next time that the application and/or the OS attempts to access the same file page, the release-behind component checks the history buffer. Since the repage bit is set for this file page in the history buffer, the release-behind component does not discard the file page from the cache. In this manner, important file pages that are often accessed remain in the cache ready for access by the application. In one embodiment, the disclosed methodology may employ a respective history buffer for each file system, e.g. nonvolatile storage, that the OS mounts.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 3A-3B flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIGS. 3A-3B and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIGS. 3A-3B described above.

The flowchart of FIGS. 3A-3B illustrates the architecture, functionality, and operation of possible implementations of systems, methods and computer program products that perform network analysis in accordance with various embodiments of the present invention. In this regard, each block in the flowcharts of FIGS. 7 and 8 may represent a module, segment, or portion of code, which comprises one or more executable instructions for implementing the specified logical function(s). It should also be noted that, in some alternative implementations, the functions noted in the block may occur out of the order noted in FIG. 3. For example, two blocks shown in succession may, in fact, be executed substantially concurrently, or the blocks may sometimes be executed in the reverse order, depending upon the functionality involved. It will also be noted that each block of FIG. 3 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. An information handling system (IHS), comprising:
a processor:
a system memory including a file cache, the system memory being coupled to the processor, the system memory including an operating system with a release-behind component that is configured to:

store a plurality of pages in the file cache, the plurality of pages including previous pages, wherein the plurality of pages are contiguous, wherein particular pages of the plurality of pages are present in a plurality of clusters, wherein a cluster boundary is the boundary between two particular contiguous clusters of the plurality of clusters;

receive a request for a current page;

select a candidate previous page for discarding from the file cache;

test to determine if the candidate previous page is identified by an entry in a history buffer in the system memory; and discard the candidate previous page from the file cache if the test determines that the candidate previous page is not identified by an entry in the history buffer and, if the candidate previous page is identified by an entry in the history buffer, then determining if repage information in the history buffer corresponding to the candidate previous page indicates a second repage fault for the candidate previous page, such that the candidate previous page remains in the file cache if the repage information indicates a second repage fault and the candidate previous page is discarded from the file cache if the repage information does not indicate a second repage fault; and discard the particular pages of the plurality of pages of a previous cluster of two particular contiguous clusters of the plurality of clusters if the request for the current page has crossed the cluster boundary such that the page being read is in the next contiguous cluster of the two particular contiguous clusters of the plurality of clusters.

2. The IHS of claim 1, wherein the repage information of a candidate previous page includes a repage bit that indicates that the candidate previous page exhibited a repage fault.

3. The IHS of claim 1, wherein the release-behind component tests to determine if the current page is identified in the history buffer.

4. The IHS of claim 3, wherein in response to determining that the current page is identified in the history buffer, the release-behind component tests to determine if repage information in the history buffer corresponding to the current page indicates a repage fault for the current page.

5. The IHS of claim 4, wherein if the release-behind component determines that the repage information in the history buffer corresponding to the current page does not indicate a repage fault, then the release-behind component updates the repage information corresponding to the current page to indicate a repage fault for the current page.

6. The IHS of claim 4, wherein if the release-behind component determines that the repage information in the history buffer corresponding to the current page already indicates a repage fault, then the release-behind component leaves unchanged the repage information corresponding to the current page.

7. The IHS of claim 3, wherein in response to determining that the current page is not identified in the history buffer, the release-behind component stores information in the history buffer that identifies the current page.

8. A release-behind computer program product, comprising:

a non-transitory computer readable storage medium;

first instructions that store a plurality of pages in a file cache of a system memory, the plurality of pages including previous pages, wherein the plurality of pages are contiguous, wherein particular pages of the plurality of pages are present in a plurality of clusters, wherein a cluster boundary is the boundary between two particular contiguous clusters of the plurality of clusters;

second instructions that receive a request for a current page;

third instructions that select a candidate previous page for discarding from the file cache; and fourth instructions that test to determine if the candidate previous page is identified by an entry in a history buffer in the system memory; and fifth instructions that discard the candidate previous page from the file cache if the testing determines that the candidate previous page is not identified by an entry in the history buffer and, if the candidate previous page is identified by an entry in the history buffer, then the fifth instructions determine if repage information in the history buffer corresponding to the candidate previous page indicates a second repage fault for the candidate previous page, such that the candidate previous page remains in the file cache if the repage information indicates a second repage fault and the candidate previous page is discarded from the file cache if the repage information does not indicate a second repage fault;

sixth instructions that discard the particular pages of the plurality of pages of a previous cluster of two particular contiguous clusters of the plurality of clusters if the request for the current page has crossed the cluster boundary such that the page being read is in the next contiguous cluster of the two particular contiguous clusters of the plurality of clusters;

wherein the first, second, third, fourth, fifth and sixth instructions are stored on the non-transitory computer readable storage medium.

9. The release-behind computer program product of claim 8, wherein the repage information of a candidate previous page includes a repage bit that indicates that the candidate previous page exhibited a repage fault.

10. The release-behind computer program product of claim 8, further comprising seventh instructions that test to determine if the current page is identified in the history buffer.

11. The release-behind computer program product of claim 10, further comprising eighth instructions that, in response to determining that the current page is identified in the history buffer, test to determine if repage information in the history buffer corresponding to the current page indicates a repage fault for the current page.

12. The release-behind computer program product of claim 11, further comprising ninth instructions that, if the repage information in the history buffer corresponding to the current page does not indicate a repage fault, then the eighth instructions update the repage information corresponding to the current page to indicate a repage fault for the current page.

13. The release-behind computer program product of claim 11, further comprising tenth instructions that, if the repage information in the history buffer corresponding to the current page already indicates a repage fault, then the ninth instructions leave unchanged the repage information corresponding to the current page.

* * * * *